(12) United States Patent
MacDonald

(10) Patent No.: US 9,989,100 B1
(45) Date of Patent: Jun. 5, 2018

(54) COUPLING JOINT

(71) Applicant: Alasdair W. M. MacDonald, Surrey (CA)

(72) Inventor: Alasdair W. M. MacDonald, Surrey (CA)

( * ) Notice: Subject to any disclaimer, the term of this patent is extended or adjusted under 35 U.S.C. 154(b) by 51 days.

(21) Appl. No.: 14/884,835

(22) Filed: Oct. 16, 2015

(51) Int. Cl.
*F16D 3/205* (2006.01)

(52) U.S. Cl.
CPC ................. *F16D 3/2057* (2013.01)

(58) Field of Classification Search
CPC .................................................... F16D 3/2057
USPC ................. 464/115, 120, 141, 146
See application file for complete search history.

(56) References Cited

U.S. PATENT DOCUMENTS

| | | | |
|---|---|---|---|
| 5,160,299 A * | 11/1992 | Sweeney | F16D 3/221 |
| | | | 464/141 |
| 6,120,382 A | 9/2000 | Sone et al. | |
| 6,135,891 A | 10/2000 | Sone et al. | |
| 6,261,184 B1 * | 7/2001 | Jacob | F16D 3/224 |
| | | | 464/146 X |
| 6,685,571 B1 | 2/2004 | Smith | |
| 7,651,400 B2 | 1/2010 | Yamazaki | |
| 8,348,773 B2 | 1/2013 | Kozlowski | |
| 8,403,765 B2 | 3/2013 | Maucher | |
| 8,506,202 B2 | 8/2013 | Nakagawa et al. | |
| 8,512,156 B2 | 8/2013 | Kim | |

FOREIGN PATENT DOCUMENTS

GB            403382        * 12/1933

OTHER PUBLICATIONS

Universal Joint and Driveshaft Design Manual, AE-7, Society of Automotive Engineers, Inc., Warrendale, PA, pp. 99-101 and 145-150, TJ1079.S62 1979.*

* cited by examiner

*Primary Examiner* — Greg Binda
(74) *Attorney, Agent, or Firm* — Aaron R. Cramer; Cramer Patent & Design, PLLC

(57) ABSTRACT

A coupling joint having a hollow cylindrically-shaped housing with a closed end and a housing opening is described. The housing has a ring groove adjacent the opening and a splined housing shaft which extends from the closed end. A spherical bearing is partially located within the housing. The spherical bearing has a splined bearing shaft that extends from the housing. A first socket half and a second socket half are located within the housing. The first and second socket halves capture the spherical bearing in a socket formed by the first socket half and by the second socket half. A housing snap ring located in a ring groove retains the first socket half; the spherical bearing and the second socket half within the housing. A first socket half and second socket half receive couplers that mate the spherical bearing to the first socket half and second socket half.

17 Claims, 13 Drawing Sheets

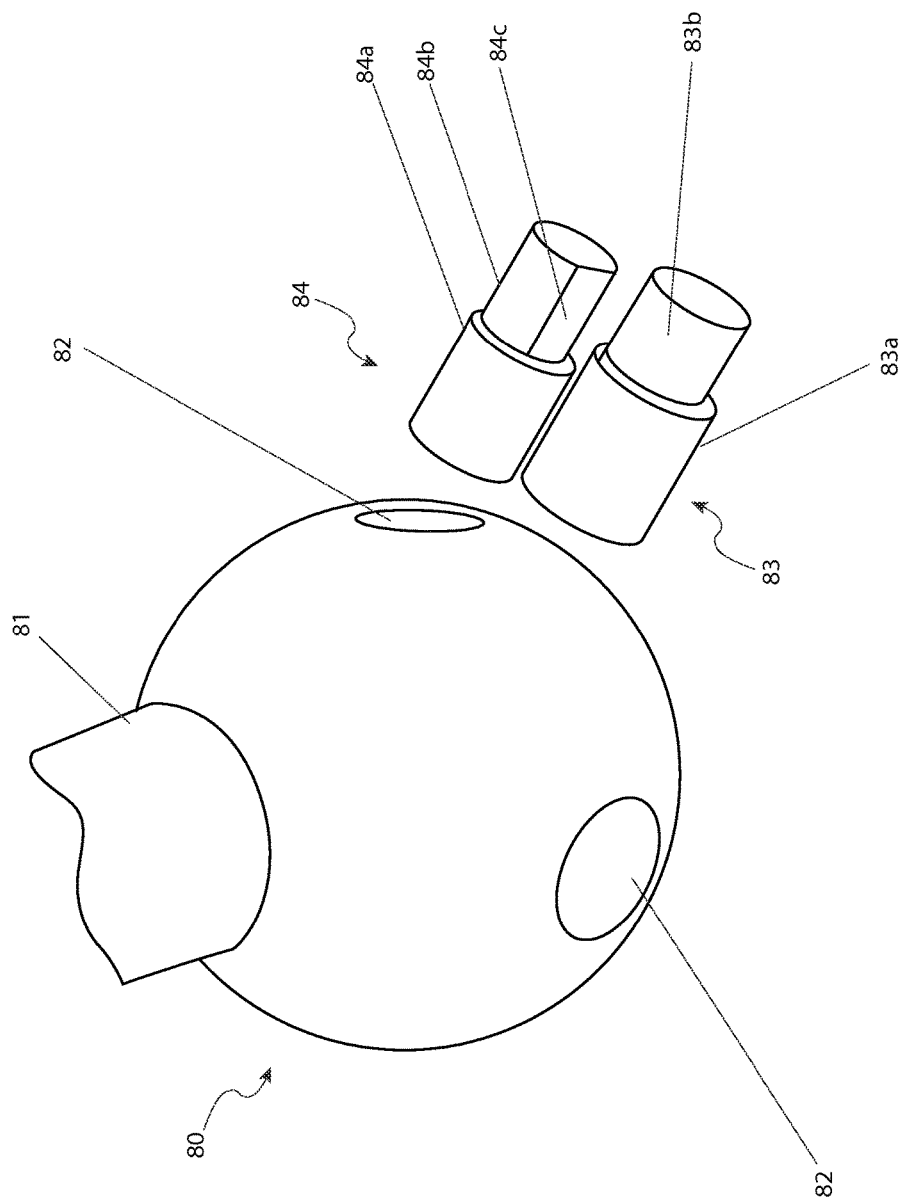

COUPLING JOINT

RELATED APPLICATIONS

There are no related applications.

FIELD OF THE INVENTION

The presently disclosed subject matter is directed to vehicle drive systems. More particularly it is directed to an improved coupling joint for transferring power from a transmission to a drive shaft.

BACKGROUND OF THE INVENTION

Since the inception of engine-propelled vehicles it has been necessary to transfer power from the engine to at least one (1) drive wheel. While many schemes have been implemented to transfer power one highly successful approach is to couple the engine output to a transmission and from the transmission to a drive shaft and from the drive shaft to a transaxle and from the transaxle to one (1) or more wheels.

The foregoing drive train has at least one (1) major problem when used in modern vehicles. Modern vehicles have suspension systems that provide comfort, stability, and improved handling characteristics. Such suspension systems require the drive train to operate over varying angles between the transmission and the transaxle. Since straight-line drive trains are unsuitable some means of handling varying drive train angles is required.

One (1) very successful approach to handling varying drive train angles is to insert a "U" joint between the transmission and the transaxle. While "U" joints are remarkably strong and allow varying drive train angles, in practice the angle ranges are limited. As the angle gets too great "U" joints become difficult to turn and "notchy" in that smooth rotation is lost.

When the range of drive train angles becomes too great, such as in modern front wheel drives systems, "U" joints become ineffective. Modern front wheel drive systems can and do develop drive train angles that "U" joints just cannot properly handle. Because of that modern front wheel drive systems replace "U" joints with coupling joints that can handle much large drive train angles.

Coupling joints transfer power in such a manner that the rotational velocity between the power drive side and the output drive side remain constant. In "U" joints, the rotational velocity varies over a complete rotation. The greater the drive train angle the larger the rotational velocity varies.

While many different implementations of coupling joints have been developed over the years as a general rule coupling joints have various problems that "U" joints typically don't suffer from. Coupling joints are usually not as strong as "U" joints, they suffer from a high sensitivity to contamination, they have numerous components parts, they are heavy and rather difficult to assemble and difficult to install, and they can be very difficult and expensive to lubricate.

Accordingly, there exists a need for relatively strong coupling joints that are relatively insensitive to contamination, have fewer components and are thus lighter, and are easy to assemble, install and lubricate.

SUMMARY OF THE INVENTION

The principles of the present invention provide for improved coupling joints that are relatively strong, insensitive to contamination, have fewer components, are lighter, and are easy to assemble, install and lubricate.

A coupling joint that is in accord with the present invention includes a hollow cylindrically-shaped housing having a closed end and a housing opening. The housing further includes a ring groove adjacent the housing opening and an integral housing shaft which extends from the closed end. The housing shaft includes first axial aligned splines and a distal threaded shaft region for receiving a fastener. The coupling joint further includes a spherical bearing which is partially located within the housing. The spherical bearing has a bearing shaft that extends from the housing opposite the housing shaft. The bearing shaft includes second axial aligned splines. A first socket half is located within the housing adjacent the closed end. The first socket half receives the spherical bearing. Also included is a second socket half within the housing and adjacent the housing opening. The second half socket also receives the spherical bearing so as to capture the spherical bearing in a socket formed by the first socket half and by the second socket half. A housing snap ring is located in a ring groove to retain the first socket half, the spherical bearing and the second socket half within the housing.

The spherical bearing and its bearing shaft as well as the housing and its housing shaft are both beneficially fabricated from one piece of high strength steel. The first socket half, the spherical bearing, and the second socket half support synchronous rotation of the housing shaft and bearing shaft while also supporting relative orbital positioning of the bearing shaft.

In practice the first socket half and the second socket half have cylinder-shaped outer surfaces that enable sliding insertion through the housing opening and into the housing. Also in practice the first socket half has a semi-spherical shaped internal first socket cavity, the second socket half has a complementing cup-shaped internal second socket cavity, and the first socket cavity and second socket cavity form a spherical cavity which entraps the spherical bearing. The first socket half and the second socket half may be joined via a threaded fastener installed into correspondingly aligned apertures. The first socket half and the second socket half and the spherical bearing are joined into a subassembly which is inserted into the housing.

Beneficially the coupling joint includes a grease fitting on the closed end, preferably a Zerk-type fitting. Also beneficially the first socket half includes a first socket pin slot and a first socket half keyway disposed along its cylinder-shaped outer surface. The second socket half also beneficially includes a second socket pin slot and a second socket half keyway disposed along its cylinder-shaped outer surface. The second socket half may include both a first seal and a second seal. The first and second socket half keyways align with a first housing keyway and a second housing keyway in the housing. A first key and a second key align the keyways together. Preferably the keys have a rectangular cross-section.

The first seal may be an "O"-ring that fits into a first "O"-ring groove machined into the second socket half while the second seal may be an "O"-ring that fits into a second "O"-ring groove machined into the second socket half.

In any event the coupling joint further includes a first coupler that extends from the spherical bearing into the first pin slot and a second coupler that extends from the spherical bearing into the second pin slot. The second coupler may be a cylindrical pin having a major section with a major diameter and a minor section with a minor diameter that is less than the major diameter. The second coupler may further include parallel second pin flats along the minor section. The second coupler may fit into a slot having a semi-spherical shaped cross-section. The coupling joint may also include a protective outer boot.

BRIEF DESCRIPTION OF THE DRAWINGS

The advantages and features of the present invention will become better understood with reference to the following more detailed description and claims taken in conjunction with the accompanying drawings in which like elements are identified with like symbols and in which:

FIG. 9b is a perspective view of the spherical bearing 80 and a corresponding first pin 83 and second pin 84 of the coupling joint 10;

Figure 1:
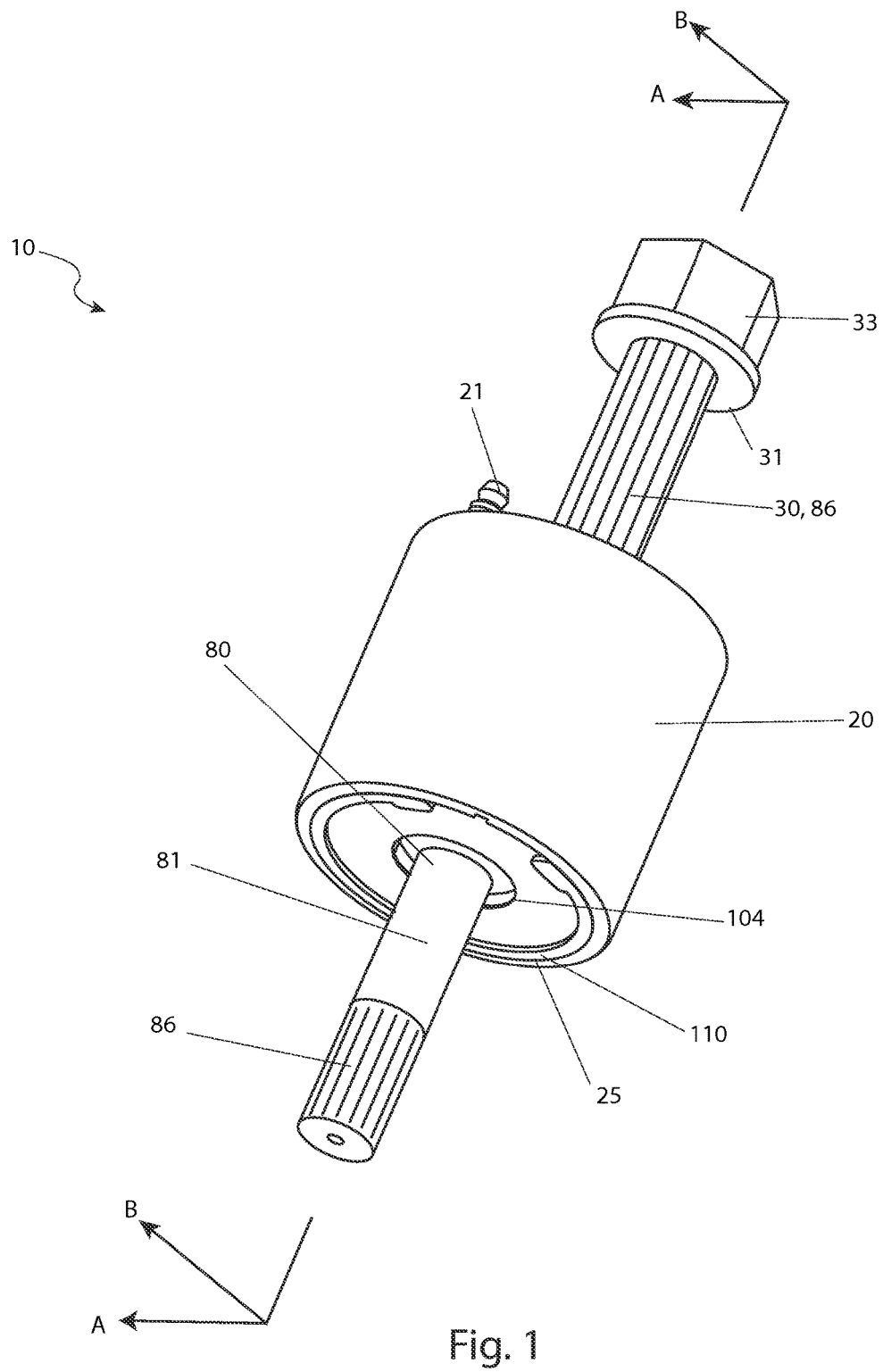
FIG. 1 is a perspective view of a coupling joint 10 that is in accord with a preferred embodiment of the present invention.

DESCRIPTIVE KEY 10 coupling joint
20 housing
21 grease fitting
25 housing opening
27 snap ring groove
28 housing keyway
30 housing shaft
31 washer
33 nut fastener
35 threaded shaft region
42 grease port
50 key
60 first socket half
61 first socket cavity
63 first socket aperture
64 socket joining fastener
65 threaded fastener aperture
66 first socket pin slot
67 first socket keyway
70 fastener aperture
80 spherical bearing
81 bearing shaft
82 pin aperture
83 first pin
83a first pin major section
83b first pin minor section
84 second pin
84a second pin major section
84b second pin minor section
84c second pin flat
86 spline section
87 modified bearing pin
88 ball bearing pin
100 modified second socket half
104 second socket small aperture
105 second socket cavity
106 second socket pin slot
107 second socket keyway
109 linear groove
110 housing snap ring
115 first seal
117 second seal
119 rubber boot
120 boot clamp
200 alternate spherical bearing
202 spherical bearing shaft
203 spherical bearing aperture
204 shaft spline
205 bearing spline
206 retaining ring/groove

DETAILED DESCRIPTION OF THE PREFERRED EMBODIMENT

Figure 9A:
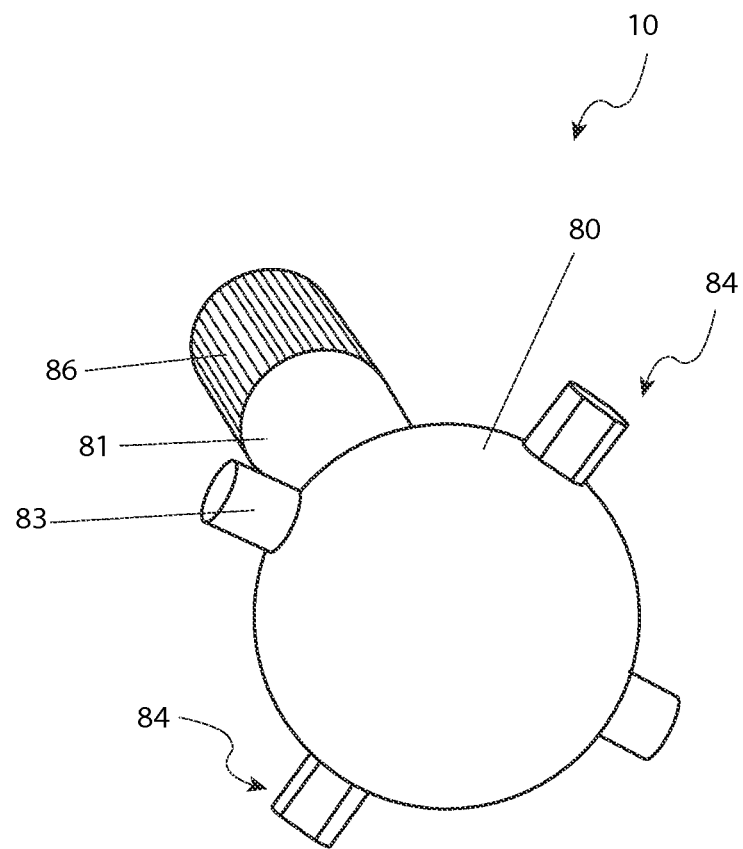
FIG. 9a is a perspective view of a spherical bearing 80 of the coupling joint 10.
Figure 10:
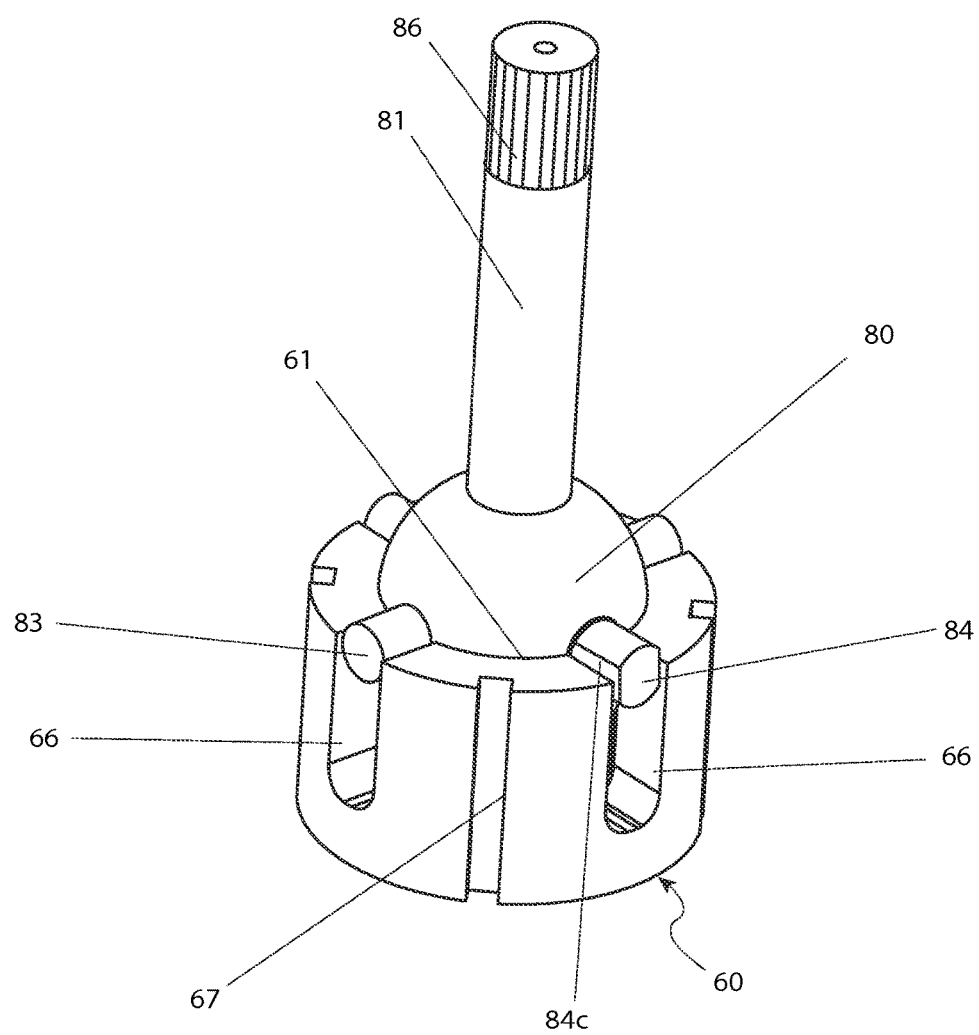
FIG. 10 is a partial assembly view of the spherical bearing 80 and first socket half 60 of the coupling joint 10.
Figure 11:
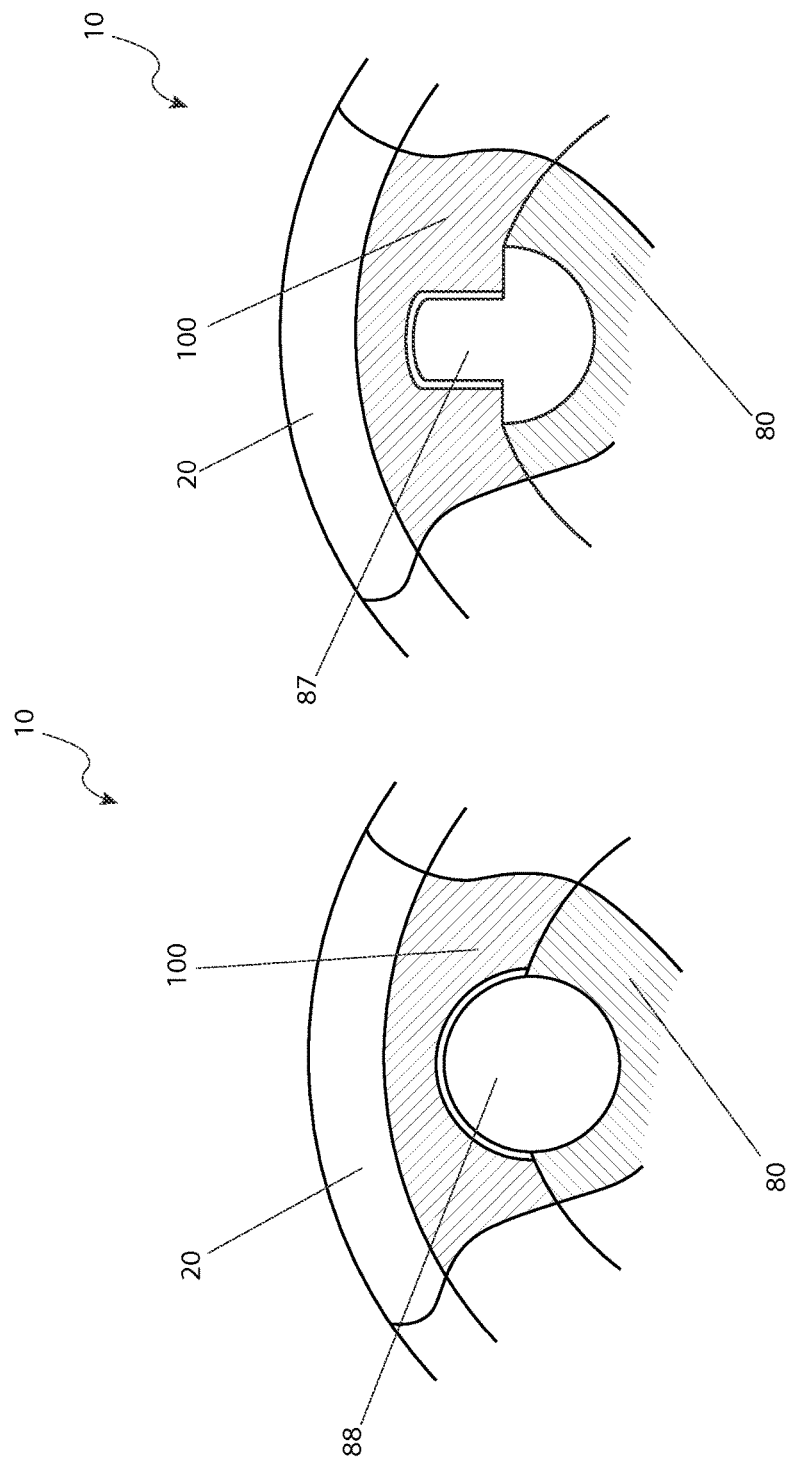
FIG. 11a is a sectional view of the coupling joint 10 depicting the integration of a ball bearing 88 drive component.
FIG. 11b is sectional view of the coupling joint 10 depicting integration of a modified ball bearing 87 drive component; and, FIG. 12 is a sectional view of the coupling joint 10 depicting integration of an alternate spherical bearing 200 and an optional rubber boot 119.
Figure 12:
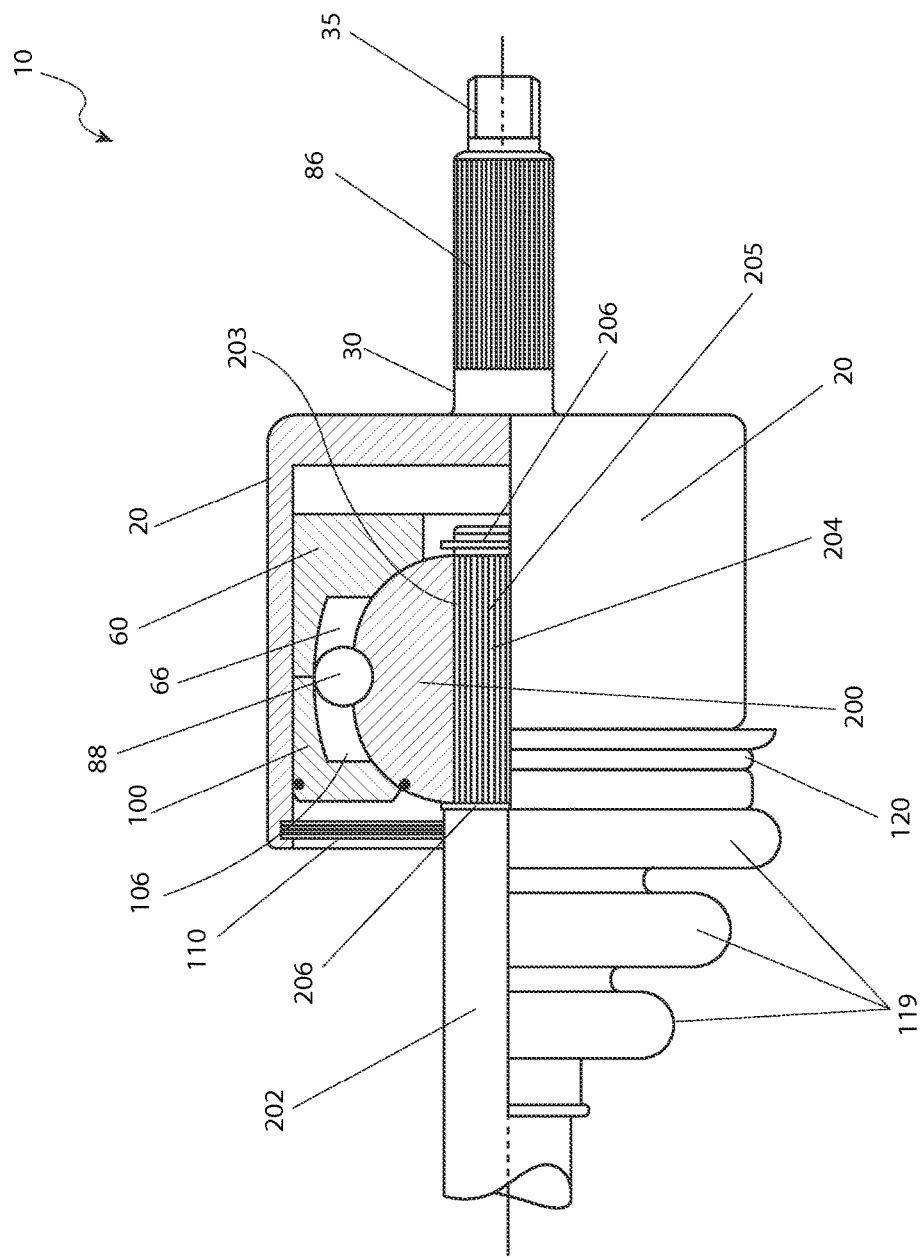

The preferred embodiment of the present invention is depicted in FIGS. 1-10 while alternative embodiments are illustrated in FIGS. 11a-12. However, the invention is not limited to the specifically depicted embodiments. A person skilled in the art will appreciate that many other embodiments of the invention are possible without deviating from the basic concept of the invention. Any such work around also falls under the scope of this invention.

The terms "a" and "an" as used herein do not denote a limitation of quantity, but rather denote the presence of at least one of the referenced items. In addition, unless otherwise denoted all directional signals such as in, out, up, down, left, and right are taken with reference to FIG. 1.

Referring now to FIG. 1, the present invention describes a coupling joint 10 that transfers the rotational energy of a vehicle's drive train. The coupling joint 10 has enhanced features such as a completely sealed housed spherical bearing 80 (not shown in FIG. 1, but reference for example FIG. 3) that does not require a protective rubber boot (although one can be used, reference FIG. 12, the boot 119). Additionally, the coupling joint 10 simplifies manufacturing, reduces the total number of component parts, and reduces weight to improve vehicle performance. The coupling joint 10 also provides for fast and easy internal lubrication using external grease fittings 21 and fast and easy installation.

Figure 2:
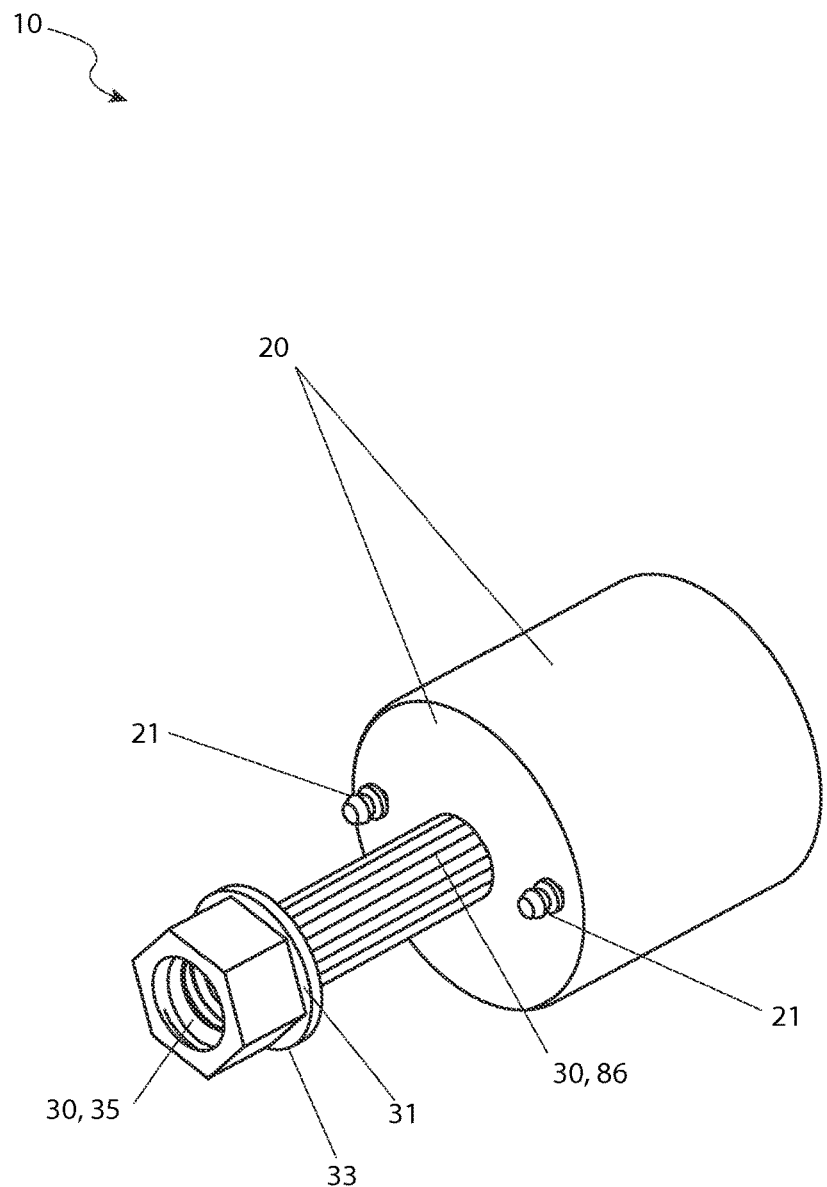
FIG. 2 is another perspective view of the coupling joint 10 shown in FIG. 1.

Referring now to FIGS. 1 and 2, the coupling joint 10 includes a cylindrically-shaped housing 20 having an integral housing shaft 30 which extending from one (1) end. Highly preferably the housing 20 and the housing shaft 30 are fabricated from one (1) piece of a strong metal such has a high strength steel.

As shown in FIGS. 3, 4, 6, 9a, 9b and 10, the coupling joint 10 also includes an internal, orbitally positionable spherical bearing 80 having a bearing shaft 81. The bearing shaft 81 extends from the opposite end of the housing 20 from the housing shaft 30.

Referring now to FIGS. 1, 2, 5a, and 6 the housing 20 and its integral shaft 30 and the bearing shaft 81 are configured to attach to corresponding female splined drive train components. To that end the housing shaft 30 includes a proximal spline section 86 having first axially aligned splines and a distal threaded shaft region 35. The threaded shaft region 35 in turn includes a correspondingly sized and threadingly attached nut fastener 33 and flat washer 31. The bearing shaft 81 also has a spline section 86 having second axially aligned splines. However, the bearing shaft 81 is not bolted into place so as to enable some linear motion.

The particular illustrated embodiment of the housing shaft 30 and the bearing shaft 81 shown in FIGS. 1-10 include the machined spline section 86 that enable mechanical attachment to other parts of a vehicle drive train. However, it is understood that the housing shaft 30 and the bearing shaft 81 may be configured and/or machined in other forms to enable mechanical engagement and use with various existing vehicle designs.

Figure 3:
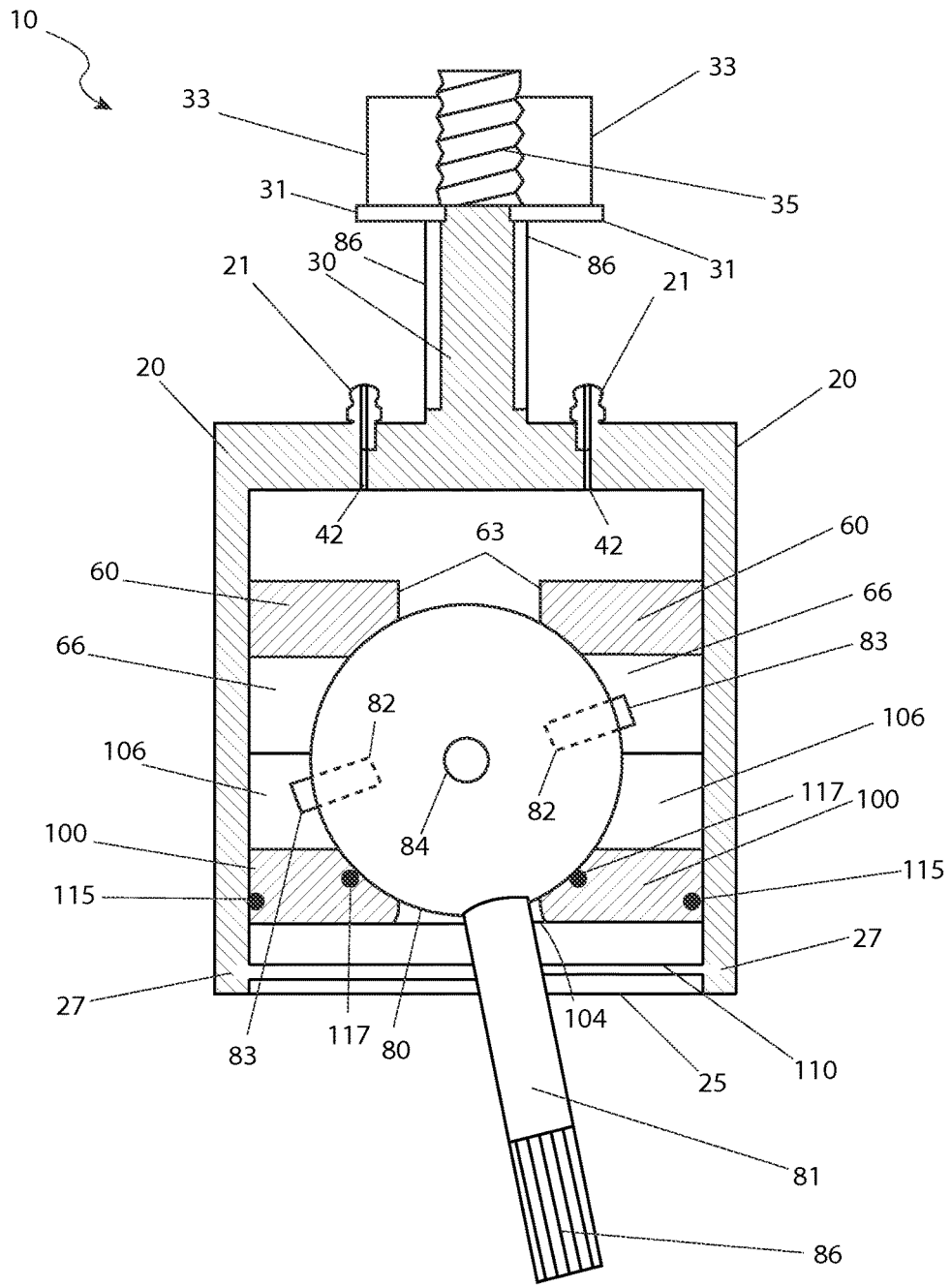
FIG. 3 is a sectional view of the coupling joint 10 taken along section line A-A of FIG. 1.
Figure 4:
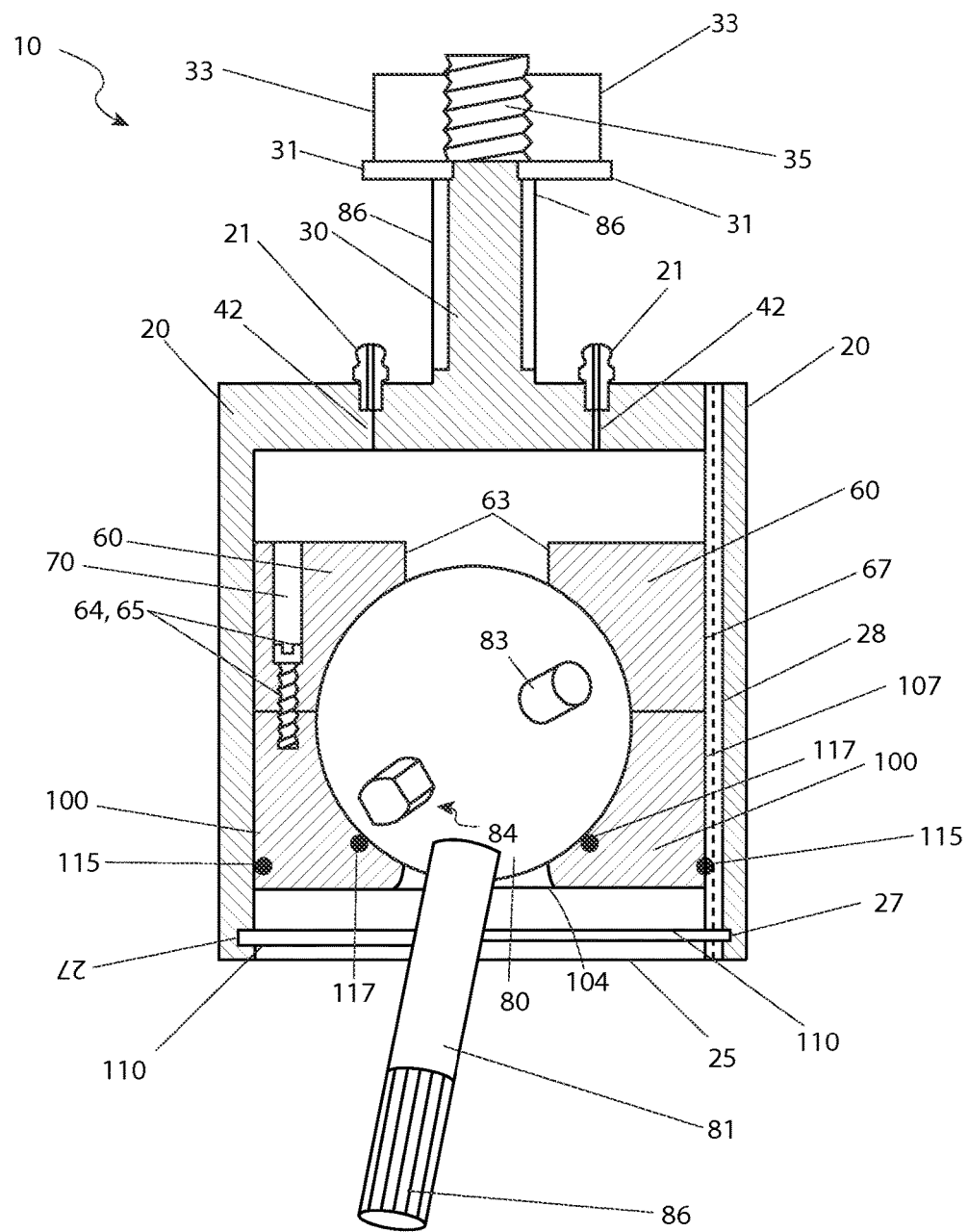
FIG. 4 is a sectional view of the coupling joint 10 taken along section line B-B of FIG. 1.
Figure 5:
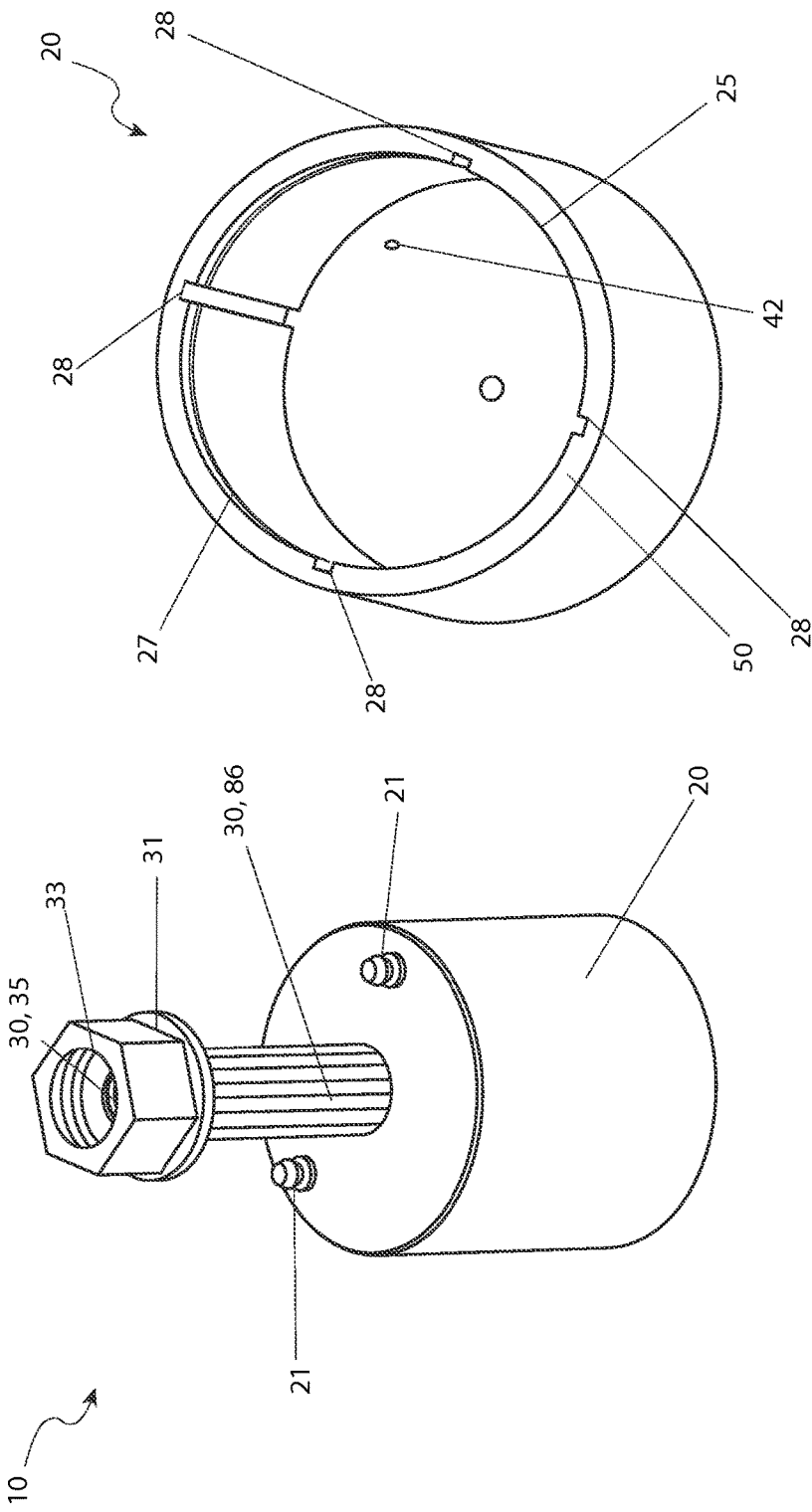
FIG. 5a is an external perspective view of a housing 20 and a housing shaft 30 of the coupling joint 10.
FIG. 5b is an internal perspective view of the housing 20 of the coupling joint 10.

Refer now to FIGS. 3, 4, 5a, and 5b for sectional views of the coupling joint 10 and perspective views of the housing 20. FIGS. 3 and 4 respectively present sectional views taken along line A-A and B-B of FIG. 1. Those sectional views are rotated approximately forty-five degrees (45°) relative to each other about the long axis of the coupling joint 10. FIGS. 5a and 5b (also reference FIG. 6) provide respective external and internal views of the housing 20 (also see FIG. 6).

The housing 20 provides a hollow cylindrical enclosure and its integral housing shaft 30 extending from a closed end. The housing 20 has a large housing opening 25 at the opposite end from the housing shaft 30. The housing opening 25 is a large circular opening that enables sliding insertion of the remaining internal portions of the coupling joint 10. Those portions include a first socket half 60, the spherical bearing 80, and a second socket half 100. Upon installation of all of the internal portions a housing snap ring 110 is installed into an inner snap ring groove 27 of the housing 20 which is located adjacent the housing opening 25. The housing snap ring 110 and the snap ring groove 27 retain the internal portions of the coupling joint 10 in their operable positions.

The coupling joint 10 supports respective synchronous rotation of the previously described housing shaft 30 and bearing shaft 81 while also supporting relative orbital positioning of the spherical bearing 80 and bearing shaft 81 to compensate for positional differences between a vehicle's transmission and other drive train components.

In the coupling joint 10 the bearing shaft 81 is integral with the spherical bearing 80 and protrudes perpendicularly from the remainder of spherical bearing 80. Highly preferably the spherical bearing 80 and its bearing shaft 81 are fabricated from one piece of metal such as high strength steel.

The bearing shaft 81 passes through a second socket aperture 104 of the second socket half 100 and then through the housing opening 25. This allows limited compensating orbital movement of the bearing shaft 81.

Referencing now FIGS. 3-4 and 6-8, the first and second socket halves 60, 100 provide similar cylinder-shaped outer surfaces having outer diameters sized to allow sliding insertion through the housing opening 25 and into the housing 20. The first and second socket halves 60, 100 respectively include a complementing cup-shaped internal first socket cavity 61 and a second socket cavity 105 which combine to form a spherical cavity which encompasses the spherical bearing 80. During assembly of the coupling joint 10, the first and second socket halves 60, 100 are joined together along a circular mating surface with the spherical bearing 80 entrapped within. The first and second socket halves 60, 100 are envisioned as being joined via a plurality of socket joining fasteners 64 that are installed into correspondingly aligned threaded fastener apertures 65 to form a combined cylindrically-shaped assembly. The spherical bearing 80, first and second socket halves 60, 100 sub-assembly is then inserted into the housing 20.

The first and second socket halves 60, 100 provide minimal clearance with the spherical bearing 80 so as to enable rotation of the spherical bearing 80 within the first and second socket halves 60, 100. The sub-assembly of the spherical bearing 80 and first and second socket halves 60, 100 can slide laterally within the housing 20 to provide a means to vary the longitudinal length of the coupling joint 10.

The housing 20 is provided with two (2) external grease fittings 21 (see FIGS. 3 and 4) to provide lubrication to the internal parts of the housing 20. The housing 20 is envisioned as being drilled and tapped adjacent the housing shaft 30 to receive the threaded grease fittings 21. The grease fittings 21 are envisioned as Zerk-type devices or an equivalent lubricant delivery component capable of injecting a lubricant though an internal grease port 42. However, the additional grease fittings 21 may be located at other places on the housing 20. Following injection of lubrication into the coupling joint 10 the grease fittings 21 may be replaced with plugs if desired. In practice the lubrication will flow under pressure through a first socket aperture 63 of the first socket half 60 so as to be subsequently distributed on the first socket half 60, the spherical bearing 80, the second socket half 100, and internal linear keys 50 and housing keyway 28 (discussed in more detail subsequently, but see FIG. 6).

Figure 6:
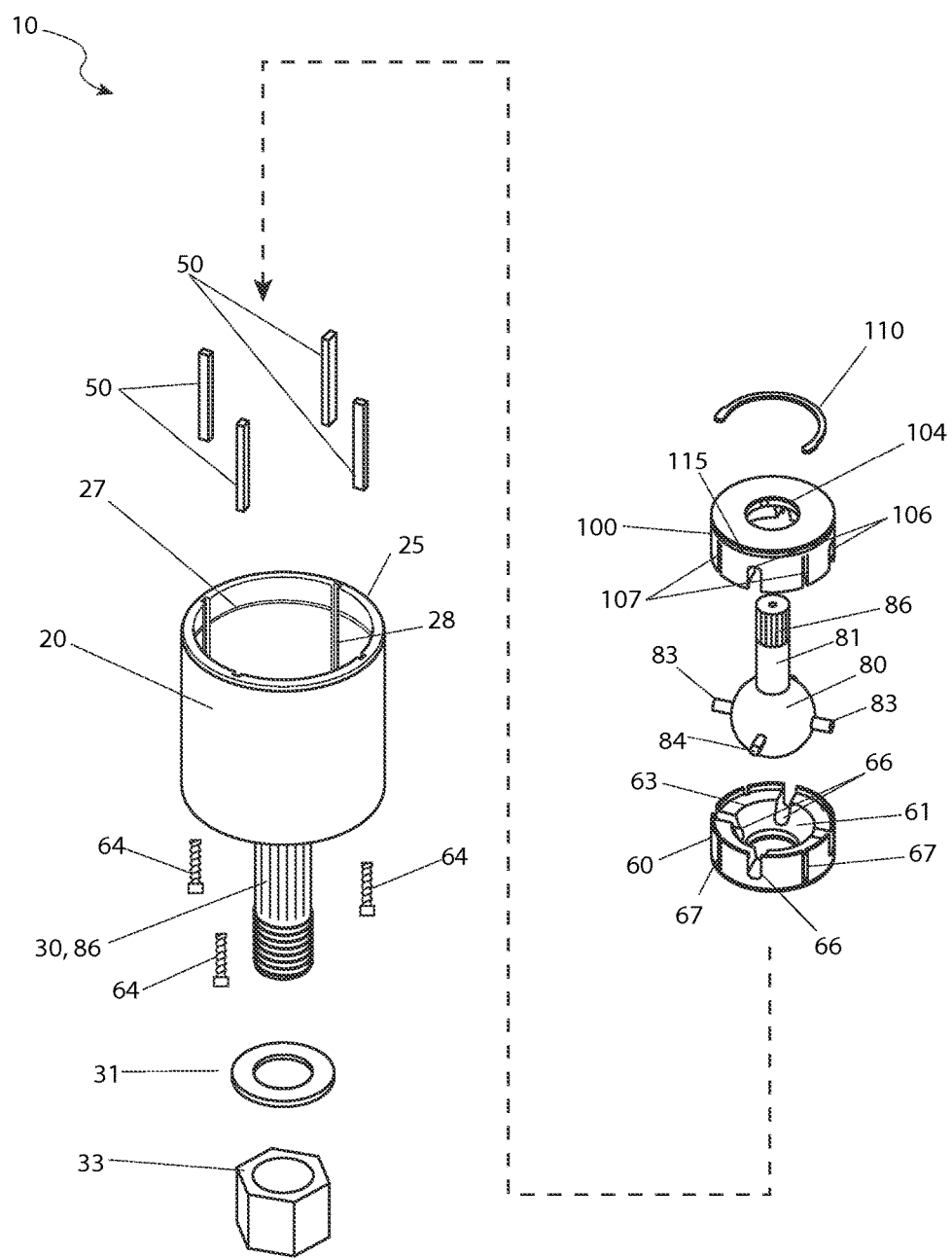
FIG. 6 is an exploded view of the coupling joint 10.

Referring now primarily to FIGS. 5b and 6, when the coupling joint 10 is assembled equally-spaced linear housing keyways 28 cut into the inner surface of the housing 20 align with linear first socket keyways 67 in the first socket half 60 and with linear second socket keyways 107 in the second socket half 100. The aligned housing keyways 28 and first and second socket keyways 67, 107 form a continuous linear slot. The keys 50 having rectangular cross-sections are inserted into the so formed liner slot. The keys 50 prevent relative rotation of the first and second socket halves 60, 100 and the housing 20. The use of the keys 50 and the described liner slot enable a quick, failsafe, and sequential assembly of the internal portions of the coupling joint 10 through the housing opening 25.

Once properly assembled, the housing snap ring 110 is installed into the snap ring groove 27 to act as a mechanical limitation of the longitudinal motion of the first and second socket halves 60, 100. The housing snap ring 110 is installed using a conventional hand tool to secure all internal portions of the coupling joint 10 within (see FIG. 1).

Figure 7:
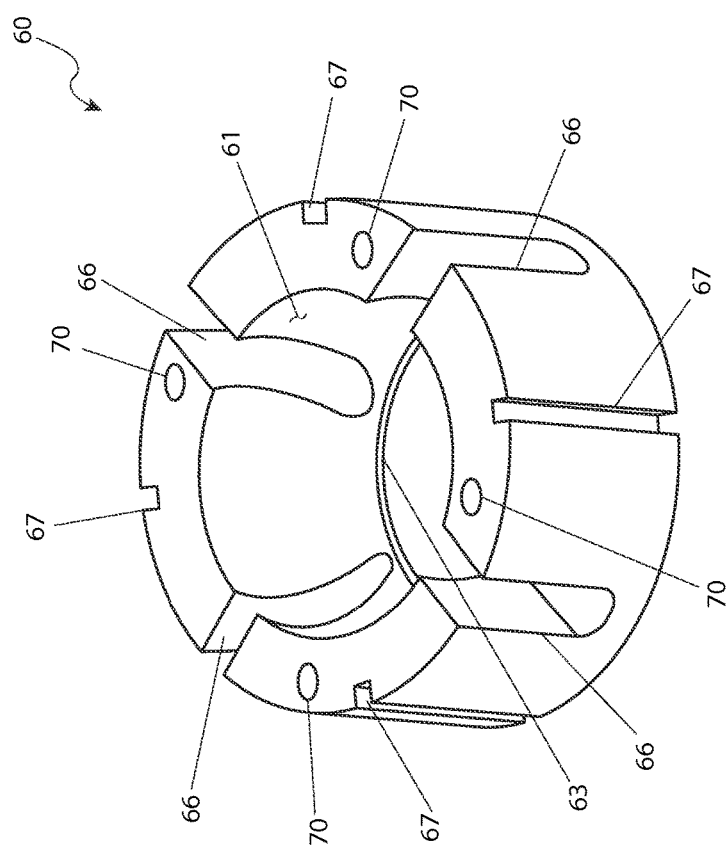
FIG. 7 is a perspective view of a first socket half 60 of the coupling joint 10.

Referring now to FIG. 7, the first socket half 60 is a unitary metal piece that interconnects with the second socket half 100 to capture the spherical bearing 80 using respective socket joining fasteners 64 and corresponding fastener apertures 70 that align with threaded fastener apertures 65 in the second socket half 100. The first socket half 60 includes the semi-spherical first socket cavity 61, the first socket aperture 63, a plurality of first socket pin slots 66, the first socket keyways 67, as well as the fastener apertures 70.

Figure 8:
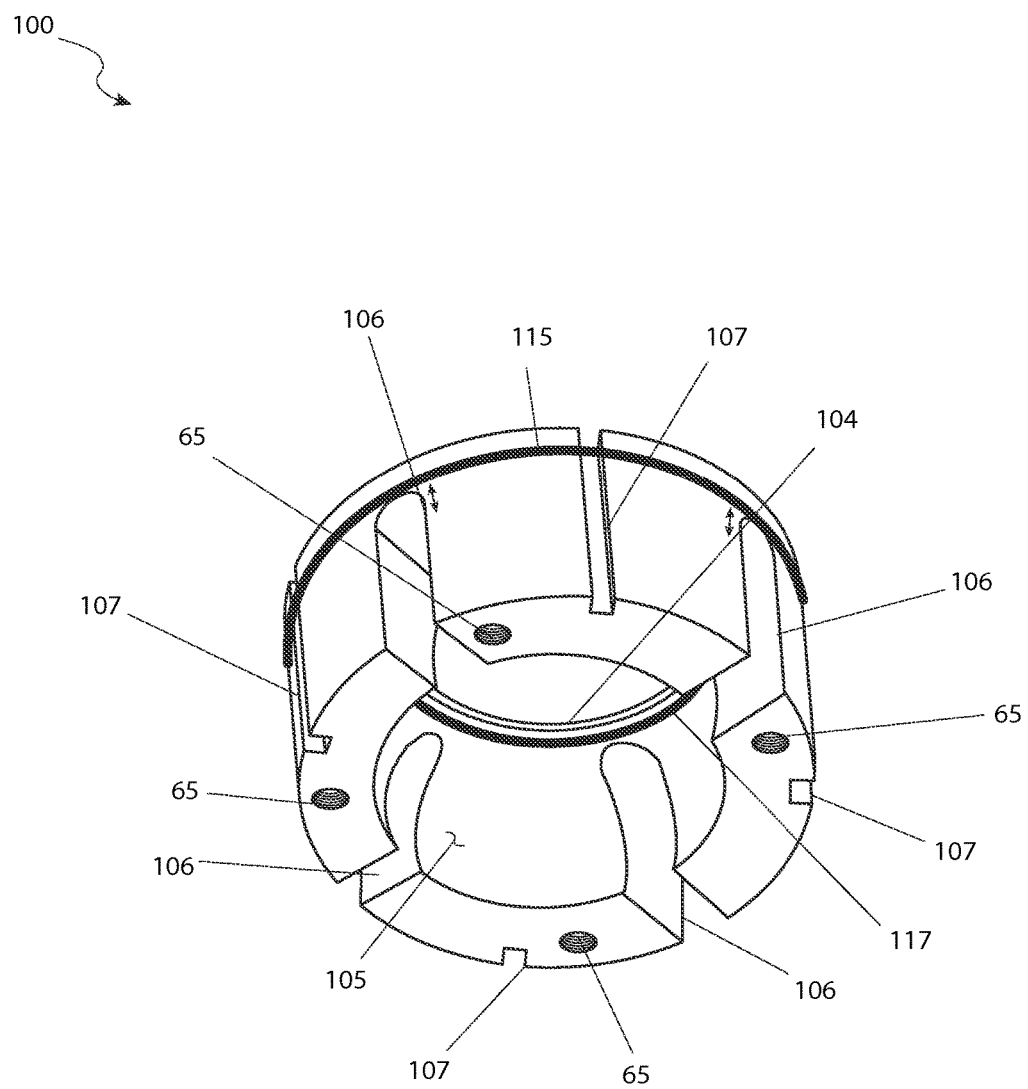
FIG. 8 is a perspective view of a second socket half 100 of the coupling joint 10.

Referring now to FIG. 8, the second socket half 100 is a unitary metal piece having the second socket aperture 104, the semi-spherical second socket cavity 105, a plurality of second socket pin slots 106, and the second socket keyways 107. Additionally, the second socket half 100 includes a first seal 115 and a second seal 117 as well as the threaded fasteners apertures 65.

The first and second seals 115, 117 are preferably "O"-ring seals that fit into respective machined "O"-ring grooves formed in the second socket half 100. The first seal 115 and the second seal 117 seal the injected lubricants in while sealing particulate contamination out. As shown, the first seal 115 is mounted on the external surface of the second socket half 100 adjacent the snap ring 110 (see, for example, FIGS. 4 and 6). The first seal 115 seals against the inner surface of the housing 20 (FIG. 4). The second seal 117 is mounted along an interior surface of the second socket half 100 adjacent the second socket small aperture 104. The second seal 117 seals against the exterior surface of the spherical bearing 80 (FIG. 4).

Referring now to FIGS. 9a, 9b, and 10, the spherical bearing 80 is a solid spherical body having a diameter just slightly smaller than the cavity formed by the first socket cavity 61 and second socket cavity 105. The spherical bearing 80 is free to move in an orbital manner within the first and second socket halves 60, 100. This varies the orbital position of the bearing shaft 81 within the mechanical limitation of the second socket aperture 104 (also see FIGS. 3 and 4).

The spherical bearing 80 mechanically engages with the first and second socket halves 60, 100 via a plurality of first pins 83 and second pins 84 that are equally-spaced about an equatorial line of the spherical bearing 80. The first 83 and second 84 pins engage corresponding first socket pin slots 66 and second socket pin slots 106 of the first socket half 60 and second socket half 100, respectively. The first 83 and second 84 pins allow the spherical bearing 80 to pivot within the first and second socket halves 60, 100 while maintaining synchronous rotation of the housing shaft 30 and bearing shaft 81. As described subsequently alternative methods may be used (see FIG. 11).

Referring now primarily to FIG. 9b, each first pin 83 includes a cylindrical first pin major section 83a and a first pin minor section 83b which has a slightly reduced diameter when compared to the first pin major section 83a. The second pins 84 include a second pin major section 84a and a second pin minor section 84b which has a slightly reduced diameter when compared to the second pin major section 84a. In addition, the second pin minor section 84b includes opposing parallel second pin flats 84c.

During initial assembly, each first pin major section 83a and each second pin major section 84a is press fit and anchored into respective pin apertures 82 of the spherical bearing 80. The first pin minor sections 83b and second pin minor sections 84b are in turn slip fit into the previously described first socket pin slots 66 and second socket pin slots 106 of the first and second socket halves 60, 100, best seen in FIGS. 3, 4 and 10.

FIGS. 11a and 11b provide partial sectional views of coupling joints 10 that use either ball bearings 88 (FIG. 11a) or modified bearing pins 87 (FIG. 11b) as couplers instead of the pins 83, 84. In either case the spherical bearing 80 and the first and second socket halves 60, 100 have to be modified to incorporate the replacement for the pins 83, 84. While FIGS. 11a and 11b show only modified second socket halves 100 it should be understood that first socket half 60 is modified in the same way.

Refer now to FIG. 12 for a sectional view of a coupling joint 10 that uses an alternate spherical bearing 200 and an optional rubber boot 119. The spherical bearing 200 includes a detachable and removable spherical bearing shaft 202. That spherical bearing shaft 202 enables enhanced maintenance, repair, and the like. The spherical bearing 200 uses a spherical bearing aperture 203 which extends through a center of the spherical bearing 200. The spherical bearing shaft 202 is secured in a non-rotating manner to the spherical bearing 200 via respective shaft splines 204 and bearing splines 205. Once inserted through the spherical bearing 200, the spherical bearing shaft 202 is secured in place within the spherical bearing aperture 203 via a pair of retaining ring/grooves 206 which are located upon the spherical bearing shaft 202 where it passes into and out of the spherical bearing 200. This accurately positions the spherical bearing shaft 202 with respect to the spherical bearing 200.

The coupling joint 10 allows installation of a conventional rubber boot 119 and corresponding boot clamp 120, if desired. The rubber boot 119 provides additional protection in applications which expose the coupling joint 10 to harsh environmental elements.

The preferred embodiment of the present invention can be utilized by a qualified mechanic or technician in a simple manner with minimal training. This may be achieved by: procuring a model of the coupling joint 10 having a housing 20 with an integral machined housing shaft 30 and a spherical bearing 80 having an integral bearing shaft 81 which fit a target vehicle; preparing the spherical bearing 80 for assembly into the first and second socket halves 60, 100 by installing the first and second pins 83, 84 by pressing the major sections 83a, 84a of respective first pins 83 and second pins 84 into respective pin apertures 82 of the spherical bearing 80; pre-assembling the first and second socket halves 60, 100 onto respective bottom and top of the spherical bearing 80 while guiding the bearing shaft 81 through the second socket aperture 104 of the second socket half 100 while coincidentally inserting the first and second pins 83, 84 of the spherical bearing 80 into the first socket pin slots 66 and second socket pin slots 106; attaching the first and second socket halves 60, 100 to each other by inserting and tightening the socket joining fasteners 64 within the correspondingly aligned fastener apertures 70 and the threaded fastener apertures 65 of the first and second socket halves 60, 100 to entrap the spherical bearing 80 within; inserting the keys 50 into the housing keyways 28; inserting the joined first and second socket halves 60, 100 into the housing 20 through the housing opening 25 while aligning the keys 50 with the first socket keyways 67 and the second socket keyways 107; installing the housing snap ring 110 within the snap ring groove 27 of the housing 20 using an appropriate pliers tool; injecting a volume of grease from a pressurized grease source into the coupling joint 10 via the grease fittings 21; verifying sliding fitment of the aforementioned internal parts of the coupling joint 10 by motioning the bearing shaft 81 in an orbital manner, and motioning the first and second socket halves 60, 100 in a linear manner within the housing 20 by grasping and extending the bearing shaft 81; installing the rubber boot 119 and boot clamp 120 onto the housing 20 if used (see FIG. 12 and based upon an anticipated application of the constant velocity joint 10); installing the coupling joint 10 into a vehicle by engaging the spline sections 86 of the housing shaft 30 and bearing shaft 81 into corresponding splines of other drive-train components; using the washer 31 and nut fastener 33 of the housing shaft 30 to secure the coupling joint 10 to the vehicle; and, benefiting from a simplified manufacturing process, a reduced number of component parts, and reduced weight, easy assembly and lubrication afforded a user of the coupling joint 10.

The method of assembling the coupling joint 10 using the alternate spherical bearing 200 may be achieved by performing the following additional steps: assembling the spherical bearing shaft 202 to the spherical bearing 200 by inserting the spherical bearing shaft 202 into the spherical bearing aperture 203 while coincidentally engaging the shaft splines 204 and bearing splines 205; securing the spherical bearing shaft 202 within the spherical bearing 200 by installing the retaining ring/groove 206; and, completing the remaining assembly and installation steps as described above.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A coupling joint, comprising:
   a hollow cylindrically-shaped housing having a closed end and a housing opening, said housing further including a ring groove adjacent said housing opening and an integral housing shaft which extends from said closed end, said housing shaft having first axial aligned splines and a distal threaded shaft region for receiving a fastener;
   a spherical bearing partially located within said housing, said spherical bearing having a bearing shaft that extends from said housing opening, said bearing shaft having second axial aligned splines;
   a first socket half within said housing and adjacent said closed end, said first socket half receiving said spherical bearing;
   a second socket half within said housing and adjacent said housing opening, said second half socket receiving said spherical bearing so as to capture said spherical bearing in a socket formed by said first socket half and by said second socket half; and,
   a housing snap ring installed into said ring groove, said housing snap ring retaining said first socket half, said spherical bearing and said second socket half within said housing;
   wherein said first socket half and said second socket half are joined via a threaded fastener installed into correspondingly aligned apertures.

2. The coupling joint recited in claim 1, wherein said spherical bearing and its bearing shaft are fabricated from one piece of steel.

3. The coupling joint recited in claim 2, wherein said housing and its housing shaft are fabricated from one piece of steel.

4. The coupling joint recited in claim 1, wherein said bearing shaft passes through a socket aperture of the second socket half and through the housing opening.

5. The coupling joint recited in claim 4, wherein said first socket half and said second socket half have cylinder-shaped outer surfaces that enable sliding insertion through said housing opening and into said housing.

6. The coupling joint recited in claim 5, wherein said first socket half has a semi-spherical shaped internal first socket cavity, said second socket half has a complementing semi-spherical internal second socket cavity, and wherein said first socket cavity and said second socket cavity form a spherical cavity which entraps the spherical bearing.

7. The coupling joint recited in claim 6, wherein said first socket half and said second socket half and said spherical bearing are joined into a subassembly which is inserted into the housing.

8. The coupling joint recited in claim 6, further including a grease fitting on said closed end.

9. The coupling joint recited in claim 8, wherein said grease fitting is a Zerk-type fitting.

10. The coupling joint recited in claim 6, wherein said first socket half includes a first socket pin slot and a first socket half keyway that is disposed along said cylinder-shaped outer surface.

11. The coupling joint recited in claim 10, wherein said second socket half includes a second socket pin slot, a second socket half keyway that is disposed along said cylinder-shaped outer surface, a first seal and a second seal.

12. The coupling joint recited in claim 11, wherein said housing includes a first housing keyway aligned with said first socket half keyway, a second housing keyway aligned with said second socket half keyway, and a first key in said first housing keyway and in said first socket half keyway, and a second key in said second housing keyway and in said second socket half keyway.

13. The coupling joint recited in claim 11, wherein said first seal is an "O"-ring that fits into a first "O"-ring groove machined into the second socket half and said second seal is an "O"-ring that fits into a second "O" ring groove machined into the second socket half.

14. The coupling joint recited in claim 11, further including a first coupler that extends from said spherical bearing into said first pin slot and a second coupler that extends from said spherical bearing into said second pin slot.

15. The coupling joint recited in claim 14, wherein said second coupler is a cylindrical pin having a major section with a major diameter and a minor section with a minor diameter that is less than said major diameter, said second coupler further includes parallel second pin flats along said minor section.

16. The coupling joint recited in claim 14, wherein said second coupler fits into a slot having a semi-spherical shaped cross-section.

17. The coupling joint recited in claim 14, further includes a protective outer boot.

* * * * *